(12) United States Patent
Buser et al.

(10) Patent No.: US 9,108,450 B2
(45) Date of Patent: Aug. 18, 2015

(54) VOICE-CONTROLLED THREE-DIMENSIONAL FABRICATION SYSTEM

(75) Inventors: Anthony James Buser, Reading, PA (US); Nathaniel B. Pettis, Brooklyn, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 362 days.

(21) Appl. No.: 13/556,012

(22) Filed: Jul. 23, 2012

(65) Prior Publication Data

US 2013/0297320 A1     Nov. 7, 2013

Related U.S. Application Data

(60) Provisional application No. 61/642,745, filed on May 4, 2012.

(51) Int. Cl.
*G10L 21/00*     (2013.01)
*B41M 5/34*     (2006.01)
*B29C 67/00*     (2006.01)
*C09D 11/50*     (2014.01)

(52) U.S. Cl.
CPC .............. *B41M 5/34* (2013.01); *B29C 67/0055* (2013.01); *C09D 11/50* (2013.01); *B29K 2995/002* (2013.01); *Y10T 428/2929* (2015.01)

(58) Field of Classification Search
CPC .... B41M 3/00; B41M 5/0041; B41M 5/0082; B29C 37/0025; B29C 37/3842; C09D 5/1693
USPC .................. 704/231, 235, 275, 251, 255, 257
See application file for complete search history.

(56) References Cited

U.S. PATENT DOCUMENTS 6,975,993 B1 * 12/2005 Keiller ........................ 704/275
2002/0057203 A1 * 5/2002 Borders et al. ............. 340/573.1
2010/0110489 A1 * 5/2010 Kanda .......................... 358/1.15

* cited by examiner

*Primary Examiner* — Huyen Vo
(74) *Attorney, Agent, or Firm* — Strategic Patents, P.C.

(57) ABSTRACT

An additive three-dimensional fabrication system includes voice control for user interaction. This voice-controlled interface can enable a variety of voice-controlled functions and operations, while supporting interactions specific to consumer-oriented fabrication processes.

30 Claims, 4 Drawing Sheets

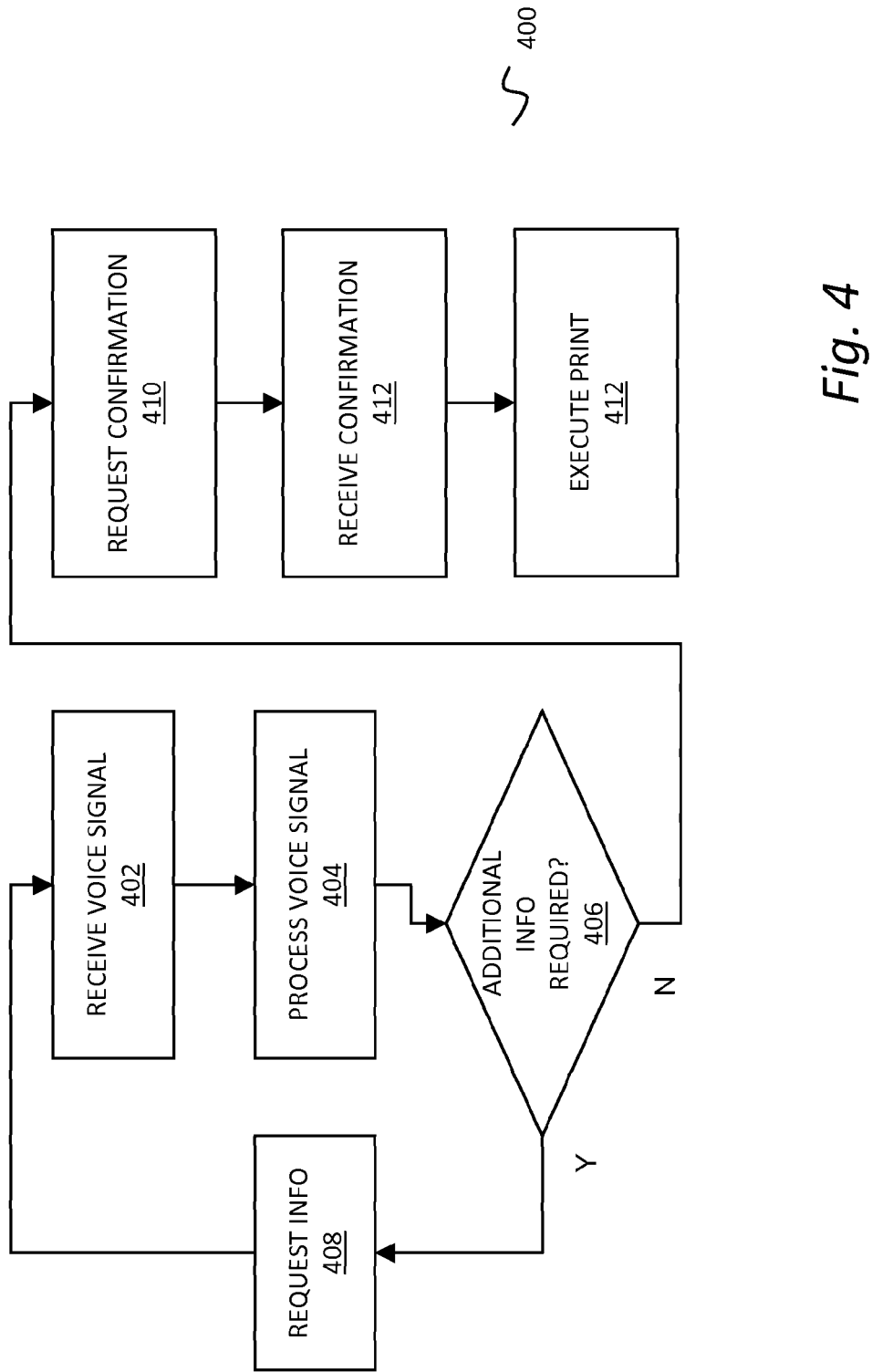

VOICE-CONTROLLED THREE-DIMENSIONAL FABRICATION SYSTEM

RELATED APPLICATIONS

This application claims the benefit of U.S. App. No. 61/642,745 filed on May 4, 2012.

This application is related to U.S. application Ser. No. 13/314,337 filed on Dec. 8, 2011.

The entire content of the foregoing applications is hereby incorporated by reference.

BACKGROUND

In an additive three-dimensional fabrication system, a physical object can be realized from a digital model by depositing successive layers of a build material that accumulate to provide the desired form. The increasing availability and decreasing cost of such three-dimensional fabrication systems has created opportunities for in-home rapid prototyping and other personal manufacturing. In this context, there remains a need for improved interfaces that provide greater flexibility and convenience to users.

SUMMARY

An additive three-dimensional fabrication system includes voice control for user interaction. This voice-controlled interface can enable a variety of voice-controlled functions and operations, while supporting interactions specific to consumer-oriented fabrication processes.

In one aspect, a device disclosed herein includes an additive fabrication system; an audio input coupled to the additive fabrication system; an audio output coupled to the additive fabrication system; and a processor configured to receive a voice signal from the audio input, process the voice signal to extract a command for the additive fabrication system, an object identifier, and at least one dimensional specification; and when the command includes a print command, to cause the additive fabrication system to execute the print command based upon the object identifier and the dimensional specification.

The processor may be further configured to identify an error in the voice signal, and to request a clarification for the error with spoken output through the speaker. The error may relate to the command. The error may include an unrecognized command. The error may include an incomplete command wherein at least one element is missing. The incomplete command may be an incomplete print command, and the at least one element may include the object identifier or the dimensional specification. The error may occur when the object identifier cannot be correlated to any printable object. The error may occur because the object identifier requires disambiguation to resolve to a unique printable object. The error may relate to the dimensional specification. For example, the dimensional specification may exceed a build volume of the additive fabrication system, or the dimensional specification may exceed a dimensional processing capability of the additive fabrication system.

The print command may include an instruction to fabricate an object. The object identifier may specify a three-dimensional model of an object. The object identifier may include at least one of a file name and file metadata. The dimensional specification may include at least one of a scale of an object and a dimension of an object, the dimension of the object further including at least one of height, width, and depth. The processor may be further configured to extract a build material specification from the voice signal, the build material specification used to select a type of the build material for the additive fabrication system. The build material specification may include a color specification used to select a color of the build material. The type may be one of a plurality of different types of build material available to the additive fabrication system. The additive fabrication system may be configured to detect the type of the build material using at least one sensor, and wherein the processor is configured to confirm that the actual build material corresponds to the type of the build material corresponds to the build material specification. The processor may be further configured to extract one or more print parameters from the voice signal. The one or more print parameters may include an infill percentage. The one or more print parameters may include a relative print speed. The processor may be further configured to provide a status update as spoken output through the speaker. The status update may relate to completion of a build. The status update may relate to availability of the additive fabrication system. The status update may relate to instrumentation of the additive fabrication system.

The processor may be further configured to transmit the voice signal in digital form to a remote processing facility for speech recognition. The remote processing facility may return instructions to the additive fabrication system. The remote processing facility may return text to the processor, and the processor may be further configured to parse the text into one or more commands for the additive fabrication system. In another aspect, there is disclosed herein a method including the steps of receiving a voice signal; processing the voice signal to extract a command for an additive fabrication system, an object identifier, and at least one dimensional specification; and when the command includes a print command for the additive fabrication system, performing the steps of: identifying a file corresponding to the object identifier that contains a model of an object; scaling the model according to the at least one dimensional specification; and creating one or more instructions for the additive fabrication system to fabricate the object from the scaled model.

The method may, for example be realized as computer executable code embodied in a non-transitory medium that, when executing on one or more computing devices performs the foregoing steps. The one or more computing devices may include any combination of a controller or processor on an additive fabrication system, a computer or the like coupled to the additive fabrication system, and/or a remote processing facility such as a print server or the like coupled in a communicating relationship with the additive fabrication system and/or computer through a data network.

BRIEF DESCRIPTION OF THE FIGURES

The invention and the following detailed description of certain embodiments thereof may be understood by reference to the following figures:

FIG. 4 shows a process for interactive voice control of a printer.

DETAILED DESCRIPTION

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus the term "or" should generally be understood to mean "and/or" and so forth.

Described herein are devices and methods for using networked three-dimensional printers. It will be understood that while the exemplary embodiments below emphasize fabrication techniques using extrusion, the principles of the invention may be adapted to a wide variety of three-dimensional fabrication processes, and in particular additive fabrication processes including without limitation selective laser sintering, fused deposition modeling, multijet printing, and the like. Any reference herein to a fabrication process such as building, printing, or three-dimensional printing is intended to refer to any and all such additive fabrication processes, and terms such as printer, fabrication resource, additive fabrication system, and the like are intended to refer to any and all such additive fabrication systems, unless a different meaning is explicitly stated or otherwise clear from the context. Thus by way of example and not of limitation, a three-dimensional printer (or simply "printer") is now described that may be used as a voice-controlled additive fabrication system.

Figure 1:
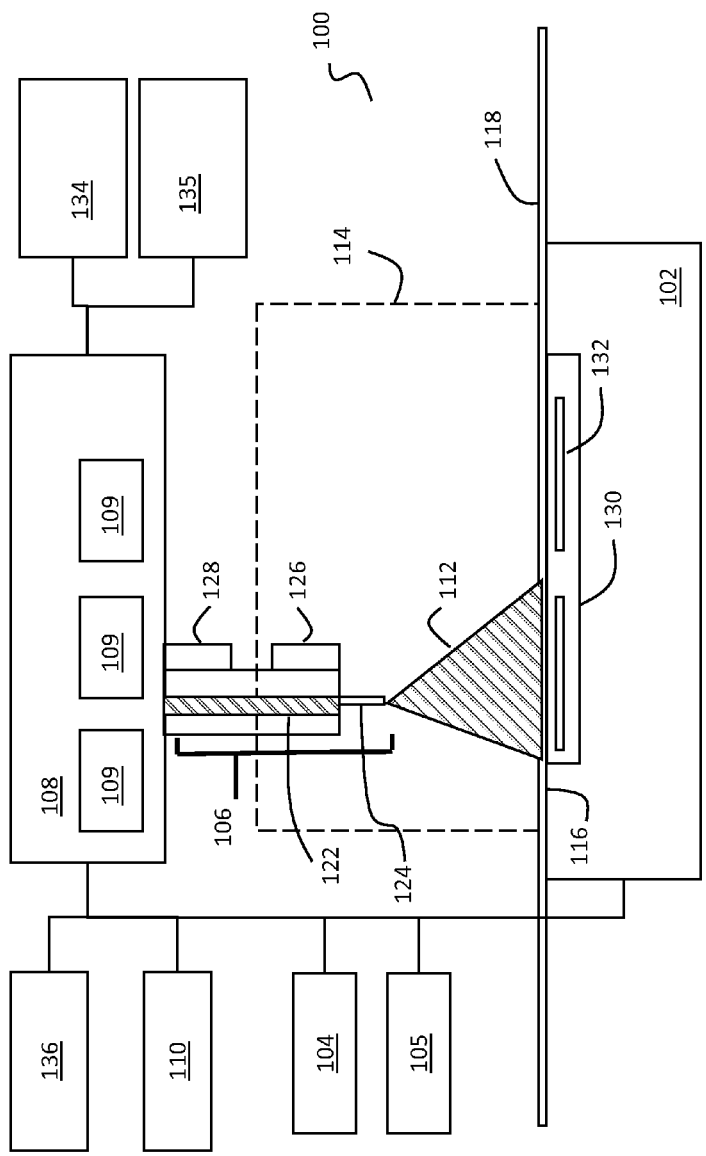
FIG. 1 is a block diagram of a three-dimensional printer.

FIG. 1 is a block diagram of a three-dimensional printer. In general, the printer 100 may include a build platform 102, an audio input 104, an audio output 105, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may provide a fixed, dimensionally and positionally stable surface on which to build the object 112.

The build platform 102 may include a thermal element 130 that controls the temperature of the build platform 102 through one or more active devices 132 such as resistive elements that convert electrical current into heat, Peltier effect devices that can create a heating or cooling effect, or any other thermoelectric heating and/or cooling devices. Thus the thermal element 130 may be a heating element that provides active heating to the build platform 102, a cooling element that provides active cooling to the build platform 102, or a combination of these. The thermal element 130 may be coupled in a communicating relationship with the controller 110 in order for the controller 110 to controllably impart heat to or remove heat from the surface 116 of the build platform 102. Thus the thermal element 130 may include an active cooling element positioned within or adjacent to the build platform 102 to controllably cool the build platform 102.

It will be understood that a variety of other techniques may be employed to control a temperature of the build platform 102. For example, the build platform 102 may use a gas cooling or gas heating device such as a vacuum chamber or the like in an interior thereof, which may be quickly pressurized to heat the build platform 102 or evacuated to cool the build platform 102 as desired. As another example, a stream of heated or cooled gas may be applied directly to the build platform 102 or a working volume 114 before, during, and/or after a build process. Any device or combination of devices suitable for controlling a temperature of the build platform 102 may be adapted to use as the thermal element 130 described herein.

The build platform 102 may include a sheet 118 of material upon which to build the object 112. In general, the sheet 118 may be formed of any suitable material selected, e.g., for adhesion characteristics, thermal characteristics, and so forth. The sheet 118 may include a mesh material, a polyamide, a polyethylene terephthalate (commercially available in bi-axial form as MYLAR), a polyimide film (commercially available as KAPTON), or any other material suitable to a build process. A working surface of the sheet 118 (e.g., an area on the top surface of the sheet 118 within the working volume 114) may be treated in a variety of manners to assist with adhesion of build material to the surface 118 and/or removal of completed objects from the surface 118. For example, the working surface may be abraded or otherwise textured (e.g., with grooves, protrusions, and the like) to improve adhesion between the working surface and the build material. A variety of chemical treatments may be used on the working surface of the sheet 118 of material to further facilitate build processes as described herein. For example, the chemical treatment may include a deposition of material that can be chemically removed from the build platform 102 by use of water, solvents, or the like. This may facilitate separation of a completed object from the build platform 102 by dissolving the layer of chemical treatment between the object 112 and the build platform 102. The chemical treatments may include deposition of a material that easily separates from the conveyer such as a wax, mild adhesive, or the like. The chemical treatment may include a detachable surface such as an adhesive that is sprayed on to the build platform 102 prior to fabrication of the object 112. In one aspect, the sheet 118 may be formed of a sheet of disposable, one-use material that is applied from a dispenser to the build platform 102 and consumed with each successive build.

The audio input 104 may include any suitable acoustic pick up device that can capture an audio signal from an environment around the printer 100 for communication to the controller 110, such as a microphone, or an electro-mechanical input for same, such as an audio input jack or a wireless transceiver for receiving signals from a wireless microphone or the like. In certain embodiments, the audio input 104 may also or instead include a microphone of a remote device such as a smart phone for receiving spoken commands to the controller 110. In one aspect, the audio input 104 may include circuitry to convert acoustic signals into digital signals for the controller 110. In another aspect, the audio input 104 may provide an analog signal and the controller 110 may include circuitry for analog-to-digital conversion of the audio signal. As used herein, the term "audio signal" is intended to refer to acoustic energy such as spoken sounds, as well as an analog or digital representation of such acoustic energy in a form suitable for processing by the printer 100, unless a different meaning is expressly provided or otherwise clear from the context. The audio input 104 might also or instead usefully include or couple to a remote device such as a cellular phone or smart phone that can receive and pre-process spoken input that can in turn be transmitted as words to the controller 110 or, where a suitable application is installed, as commands to the controller 110 to fabricate a responsive object.

The audio output 105 may include any audio output device(s) suitable for creating audible signals from digital or analog signals from the controller 110 such as a speaker, or any electromechanical coupling for same, such as one or more audio output jacks or a wireless transceiver for communication of audio to a wireless speaker or the like. It will be appreciated that the audio input 104 and audio output 105 may be directly associated with the printer 100, e.g., mounted to or otherwise physically integrated into the printer 100, or the audio input 104 and/or the audio output 105 may be associated with a computer or other device coupled to the printer 100. In this latter embodiment, audio input and output may be conveniently provided to a printer 100 that is not otherwise equipped for interactive voice control.

The extruder 106 may include a chamber 122 in an interior thereof to receive a build material. The build material may, for example, include acrylonitrile butadiene styrene ("ABS"), high-density polyethylene ("HDPL"), polylactic acid ("PLA"), or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure. As noted above, other techniques may be employed for three-dimensional printing, including extrusion-based techniques using a build material that is curable and/or a build material of sufficient viscosity to retain shape after extrusion.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material, e.g., in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder 106 within the working volume 114 along each of an x-axis, a y-axis, and a z-axis. More generally, the x-y-z positioning assembly 108 may include various combinations of stepper motors, encoded DC motors, gears, belts, pulleys, worm gears, threads, and so forth. Any such arrangement suitable for controllably positioning the extruder 106 within the working volume 114 may be adapted to use with the printer 100 described herein.

By way of example and not limitation, the build platform 102 may be affixed to a bed that provides z-axis positioning of the build platform 102 within the working volume 114, while the extruder 106 is configured for x-y positioning within the plane of the build platform 102. As another example, the extruder 106 may be stationary while the build platform is x, y, and z positionable. As another example, the extruder 106 may be x, y, and z positionable while the build platform 102 remains fixed relative to the working volume 114. More generally, any arrangement of motors and other hardware controllable by the controller 110 to position the extruder 106 and/or build platform 102 relative to the working volume 114 may serve as the x-y-z positioning assembly 108 in the printer 100 described herein. Still more generally, while an x, y, z coordinate system serves as a convenient basis for positioning within three dimensions, any other coordinate system or combination of coordinate systems may also or instead be employed, such as a positional controller and assembly that operate according to cylindrical or spherical coordinates.

The controller 110 may be electrically coupled in a communicating relationship with the build platform 102, the audio input 104, the audio output 105, the x-y-z positioning assembly 108, and the other various components of the printer 100. In general, the controller 110 is operable to control the components of the printer 100, such as the build platform 102, the x-y-z positioning assembly 108, and any other components of the printer 100 described herein to fabricate the object 112 from a build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, the controller 110 may include a microprocessor or other processing circuitry with sufficient computational power to provide related functions such as executing an operating system, providing a graphical user interface (e.g., to a display coupled to the controller 110 or printer 100), convert three-dimensional models into tool instructions, and operate a web server or otherwise host remote users and/or activity through the network interface 136 described below. In another aspect, the controller 110 may include circuitry hosted in and/or distributed among a number of systems such as a computer attached to the printer 100 or a print server or the like remotely accessible through the Internet. All such combinations of hardware and/or software, and all such distributions of control functions, are intended to fall within the meaning of the term "controller" (or "processor") as used herein, unless a specific meaning is explicitly provided or otherwise clear from the context.

A variety of additional sensors may be usefully incorporated into the printer 100 described above. These are generically depicted as sensor 134 in FIG. 1, for which the positioning and mechanical/electrical interconnections with other elements of the printer 100 will depend upon the type and purpose of the sensor 134 and will be readily understood and appreciated by one of ordinary skill in the art. The sensor 134 may include a temperature sensor positioned to sense a temperature of the surface of the build platform 102. This may, for example, include a thermistor or the like embedded within or attached below the surface of the build platform 102. This may also or instead include an infrared detector or the like directed at the surface 116 of the build platform 102 or the sheet 118 of material. Other sensors that may be usefully incorporated into the printer 100 as the sensor 134 include a heat sensor, a volume flow rate sensor, a weight sensor, a sound sensor, a camera, and a light sensor. Certain more specific examples are provided below by way of example and not of limitation.

The sensor 134 may include a sensor to detect a presence (or absence) of the object 112 at a predetermined location in the build platform 102. This may include an optical detector arranged in a beam-breaking configuration to sense the presence of the object 112 at a particular location such as a limit of the build volume 114. This may also or instead include an imaging device and image processing circuitry to capture an image of the working volume 114 and analyze the image to evaluate a position of the object 112. This sensor 134 may be used for example to ensure that the working volume 114 is clear before initiating a build. Thus the sensor 134 may be used to determine whether an object is present that should not be, or to detect when an object is absent. The feedback from this sensor 134 may be used by the controller 110 to issue processing interrupts or otherwise control operation of the printer 100.

The sensor 134 may include a sensor that detects a position of the extruder 106 or build platform 102 within the working volume 114. This information may be obtained from an encoder in a motor of the x-y-z positioning assembly 108, or using any other suitable technique such as a visual sensor and corresponding fiducials (e.g., visible patterns, holes, or areas with opaque, specular, transparent, or otherwise detectable marking) on the sheet 118.

The sensor 134 may include a heater (instead of or in addition to the thermal element 130) to heat the working volume 114 such as a radiant heater or forced hot air to maintain the object 112 at a fixed, elevated temperature throughout a build. The sensor 134 may also or instead include a cooling element to maintain the object 112 at a predetermined sub-ambient temperature throughout a build.

The sensor 134 may also or instead include at least one video camera. The video camera may generally capture images of the working volume 114, the object 112, or any other hardware associated with the printer 100. The video camera may provide a remote video feed through the network interface 136, which feed may be available to remote users through a user interface maintained by, e.g., remote hardware such as the print servers described below with reference to FIG. 3, or within a web page provided by a web server hosted by the three-dimensional printer 100. Thus in one aspect there is disclosed herein a user interface adapted to present a video feed from at least one video camera of a three-dimensional printer to a remote user through a user interface.

The sensor 134 may include may also include more complex sensing and processing systems or subsystems, such as a three-dimensional scanner using optical techniques (e.g., stereoscopic imaging, or shape from motion imaging, time-of-flight range finding), structured light techniques, a plenoptic light field camera, or any other suitable sensing and processing hardware that might extract three-dimensional information from the working volume 114. In another aspect, the sensor 134 may include a machine vision system that captures images and analyzes image content to obtain information about the status of a job, working volume 114, or an object 112 therein. The machine vision system may support a variety of imaging-based automatic inspection, process control, and/or robotic guidance functions for the three-dimensional printer 100 including without limitation pass/fail decisions, error detection (and corresponding audible or visual alerts), shape detection, position detection, orientation detection, collision avoidance, and so forth.

Other components, generically depicted as other hardware 135, may also be included, such as input devices including a keyboard, touchpad, mouse, switches, dials, buttons, motion sensors, and the like, as well as output devices such as a display, a speaker or other audio transducer, light emitting diodes, and so forth. Other hardware 135 may also or instead include a variety of cable connections and/or hardware adapters for connecting to, e.g., external computers, external hardware, external instrumentation or data acquisition systems, and so forth.

The printer 100 may include, or be connected in a communicating relationship with, a network interface 136. The network interface 136 may include any combination of hardware and software suitable for coupling the controller 110 and other components of the printer 100 to a remote computer in a communicating relationship through a data network. By way of example and not limitation, this may include electronics for a wired or wireless Ethernet connection operating according to the IEEE 802.11 standard (or any variation thereof), or any other short or long range wireless networking components or the like. This may include hardware for short range data communications such as a BlueTooth or infrared transceiver, which may be used to couple into a local area network or the like that is in turn coupled to a data network such as the Internet. This may also or instead include hardware/software for a WiMax connection or a cellular network connection (using, e.g., CDMA, GSM, LTE, or any other suitable protocol or combination of protocols). Consistently, the controller 110 may be configured to control participation by the printer 100 in any network to which the network interface 136 is connected, such as by connecting to the network to retrieve printable content, or responding to a remote request for status or availability. Networked uses of the printer 100 are discussed in greater detail below.

With respect to voice processing as contemplated herein, certain aspects can be computationally expensive, and may be unsuited to local processing resources coupled to the printer 100. Networked environments for the printer 100 are now described in which various voice processing functions contemplated herein may be distributed among networked components, e.g., to reduce local processing demands or otherwise improve overall performance and capabilities.

Figure 2:
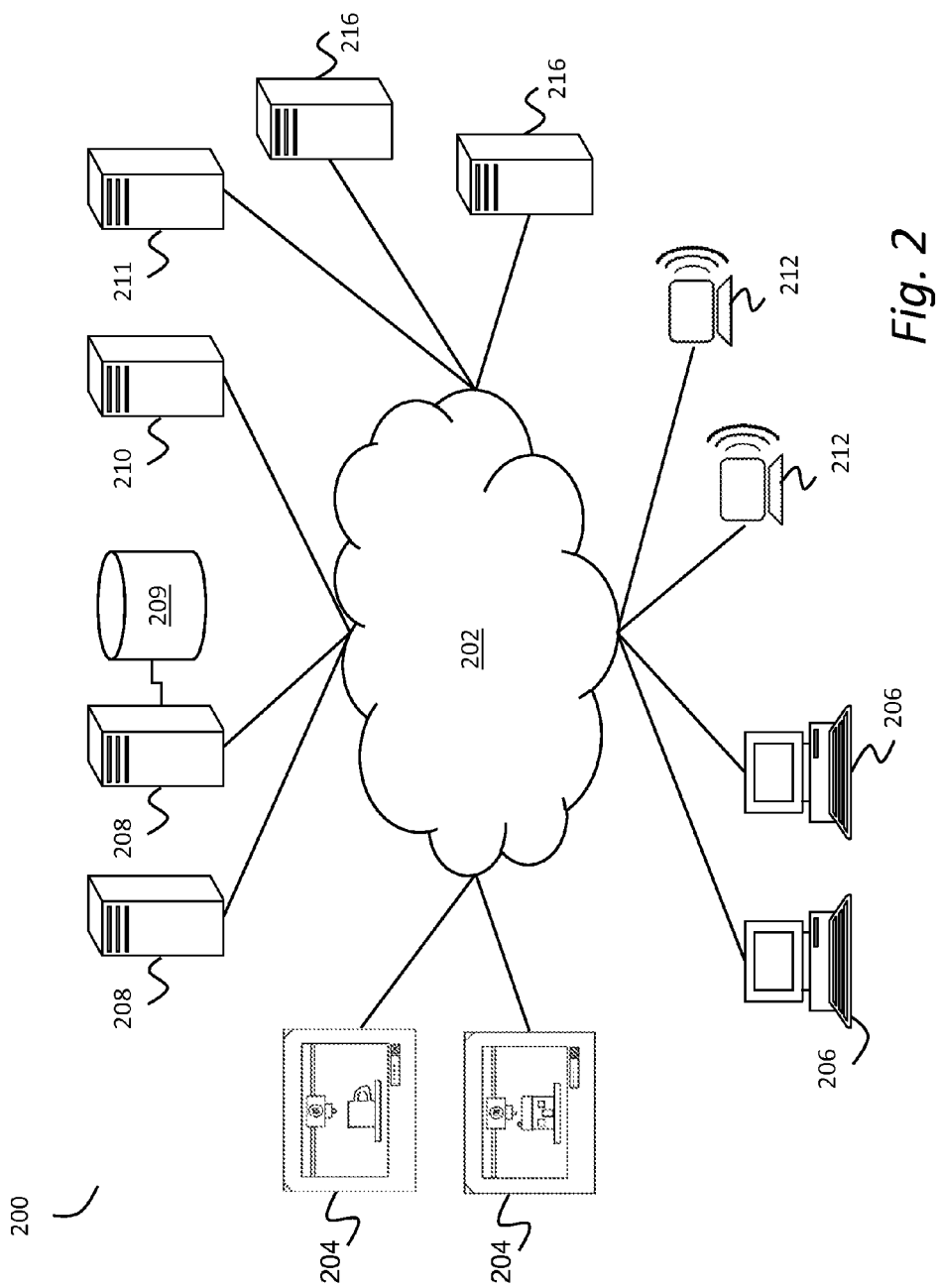
FIG. 2 depicts a networked three-dimensional printing environment.

FIG. 2 depicts a networked three-dimensional printing environment. In general, the environment 200 may include a data network 202 interconnecting a plurality of participating devices in a communicating relationship. The participating devices may, for example, include any number of three-dimensional printers 204 (also referred to interchangeably herein as "printers"), client devices 206, print servers 208, content sources 210, mobile devices 212, and other resources 216.

The data network 202 may be any network(s) or internetwork(s) suitable for communicating data and control information among participants in the environment 200. This may include public networks such as the Internet, private networks, telecommunications networks such as the Public Switched Telephone Network or cellular networks using third generation (e.g., 3G or IMT-2000), fourth generation (e.g., LTE (E-UTRA) or WiMax-Advanced (IEEE 802.16m)) and/or other technologies, as well as any of a variety of corporate area or local area networks and other switches, routers, hubs, gateways, and the like that might be used to carry data among participants in the environment 200.

The three-dimensional printers 204 may be any computer-controlled devices for three-dimensional fabrication, including without limitation any of the three-dimensional printers or other fabrication or prototyping devices described above. In general, each such device may include a network interface comprising, e.g., a network interface card, which term is used broadly herein to include any hardware (along with software, firmware, or the like to control operation of same) suitable for establishing and maintaining wired and/or wireless communications. The network interface card may include without limitation wired Ethernet network interface cards ("NICs"), wireless 802.11 networking cards, wireless 802.11 USB devices, or other hardware for wireless local area networking. The network interface may also or instead include cellular network hardware, wide area wireless network hardware or any other hardware for centralized, ad hoc, peer-to-peer, or other radio communications that might be used to carry data. In another aspect, the network interface may include a serial or USB port to directly connect to a computing device such as a desktop computer that, in turn, provides more general network connectivity to the data network 202.

The printers 204 might be made to fabricate any object, practical or otherwise, that is amenable to fabrication according to each printer's capabilities. This may be a model of a house or a tea cup, as depicted, or any other object such as gears or other machine hardware, replications of scanned three-dimensional objects, or fanciful works of art.

Client devices 206 may be any devices within the environment 200 operated by users to initiate, manage, monitor, or otherwise interact with print jobs at the three-dimensional printers 204. This may include desktop computers, laptop computers, network computers, tablets, or any other computing device that can participate in the environment 200 as contemplated herein. Each client device 206 generally provides a user interface, which may include a graphical user interface, a text or command line interface, a voice-controlled interface, and/or a gesture-based interface to control operation of remote three-dimensional printers 204. The user interface may be maintained by a locally executing application on one of the client devices 206 that receives data and status information from, e.g., the printers 204 and print servers 208 concerning pending or executing print jobs. The user interface may create a suitable display on the client device 206 for user interaction. In other embodiments, the user interface may be remotely served and presented on one of the client devices 206, such as where a print server 208 or one of the three-dimensional printers 204 includes a web server that provides information through one or more web pages or the like that can be displayed within a web browser or similar client executing on one of the client devices 206. In one aspect, the user interface may include a voice controlled interface that receives spoken commands from a user and/or provides spoken feedback to the user.

The print servers 208 may include data storage, a network interface, and a processor and/or other processing circuitry. In the following description, where the functions or configuration of a print server 208 are described, this is intended to include corresponding functions or configuration (e.g., by programming) of a processor of the print server 208. In general, the print servers 208 (or processors thereof) may perform a variety of processing tasks related to management of networked printing. For example, the print servers 208 may manage print jobs received from one or more of the client devices 206, and provide related supporting functions such as content search and management. A print server 208 may also include a web server that provides web-based access by the client devices 206 to the capabilities of the print server 208. A print server 208 may also communicate periodically with three-dimensional printers 204 in order to obtain status information concerning, e.g., availability of printers and/or the status of particular print jobs, any of which may be subsequently presented to a user through the web server or any other suitable interface. A print server 208 may also maintain a list of available three-dimensional printers 204, and may automatically select one of the three-dimensional printers 204 for a user-submitted print job, or may permit a user to specify a single printer, or a group of preferred printers, for fabricating an object. Where the print server 208 selects the printer automatically, any number of criteria may be used such as geographical proximity, printing capabilities, current print queue, fees (if any) for use of a particular three-dimensional printer 204, and so forth. Where the user specifies criteria, this may similarly include any relevant aspects of three-dimensional printers 204, and may permit use of absolute criteria (e.g., filters) or preferences, which may be weighted preferences or unweighted preferences, any of which may be used by a print server 208 to allocate a print job to a suitable resource.

In one aspect, the print server 208 may be configured to support interactive voice control of one of the printers 204. For example, the print server 208 may be configured to receive a voice signal (e.g., in digitized audio form) from a microphone or other audio input of the printer 204, and to process the voice signal to extract relevant content such as a command for the printer. Where the command is recognized as a print command, the voice signal may be further processed to extract additional context or relevant details. For example, the voice signal may be processed to extract an object identifier that specifies an object for printing, e.g., by filename, file metadata, or semantic content. The voice signal may also be processed to extract a dimensional specification, such as a scale or absolute dimension for an object. The print server 208 may then generate suitable control signals for return to the printer 204 to cause the printer 204 to fabricate the object. Where an error or omission is detected, the print server 208 may return a request for clarification to the printer 204, which may render the request in spoken form through a speaker, or within a user interface of the printer 204 or an associated device.

Other user preferences may be usefully stored at the print server 208 to facilitate autonomous, unsupervised fabrication of content from content sources 210. For example, a print server 208 may store a user's preference on handling objects greater than a build volume of a printer. These preferences may control whether to resize the object, whether to break the object into multiple sub-objects for fabrication, and whether to transmit multiple sub-objects to a single printer or multiple printers. In addition, user preferences or requirements may be stored, such as multi-color printing capability, build material options and capabilities, and so forth. More generally, a print queue (which may be a printer-specific or user-specific queue, and which may be hosted at a printer 204, a server 208, or some combination of these) may be managed by a print server 208 according to one or more criteria from a remote user requesting a print job. The print server 208 may also store user preferences or criteria for filtering content, e.g., for automatic printing or other handling. While this is described below as a feature for autonomous operation of a printer (such as a printer that locally subscribes to a syndicated model source), any criteria that can be used to identify models of potential interest by explicit type (e.g., labeled in model metadata), implicit type (e.g., determined based on analysis of the model), source, and so forth, may be provided to the print server 208 and used to automatically direct new content to one or more user-specified ones of the three-dimensional printers 204.

In the context of voice-controlled printing, the print server 208 may usefully store user-specific data such as training for a voice recognition model. The print server 208 may also or instead store voice rendering data to use in generating spoken output by the printer 204. This may, for example, include voice type data, voice model data, voice sample data, and so forth. Thus for example, a user may purchase or otherwise obtain a voice style (e.g., a celebrity voice or other personality) to render spoken commands and maintain the voice style on the print server 208. The print server 208 may also or instead store data characterizing capabilities of the printer 204 so that voice commands received at the print server 208 can be analyzed for suitability, accuracy, and so forth according to the capabilities of the printer 204 from which the voice command was received. More generally, any data or processing for voice interaction that can be usefully stored or executed remotely from the printer 204 may be located at the printer server 208. It will be understood that any such data may also or instead be stored on a client device, a printer 204, or some combination of these.

In one aspect, the processor of the print server may be configured to store a plurality of print jobs submitted to the web server in a log and to provide an analysis of print activity based on the log. This may include any type of analysis that might be useful to participants in the environment 200. For example, the analysis may include tracking of the popularity of particular objects, or of particular content sources. The analysis may include tracking of which three-dimensional printers 204 are most popular or least popular, or related statistics such as the average backlog of pending print jobs at a number of the three-dimensional printers 204. The analysis may include success of a particular printer in fabricating a particular model, or of a particular printer in completing print jobs generally. More generally, any statistics or data may be obtained, and any analysis may be performed, that might be useful to users (e.g., when requesting prints), content sources (e.g., when choosing new printable objects for publication), providers of fabrication resources (e.g., when setting fees), or network facilitators such as the print servers 208.

A print server 208 may also maintain a database 209 of content, along with an interface for users at client devices 206 to search the database 209 and request fabrication of objects in the database 209 using any of the three-dimensional printers 204. Thus in one aspect, a print server 208 (or any system including the print server 208) may include a database 209 of three-dimensional models, and the print server 208 may act as a server that provides a search engine for locating a particular three-dimensional model in the database 209. The search engine may be a text-based search engine using keyword text queries, plain language queries, and so forth. The search engine may also or instead include an image-based search engine configured to identify three-dimensional models similar to a two-dimensional or three-dimensional image provide by a user.

In another aspect, the printer server 208 may periodically search for suitable content at remote locations on the data network, which content may be retrieved to the database 209, or have its remote location (e.g., a URL or other network location identifier) stored in the database 209. In another aspect, the print server 208 may provide an interface for submission of objects from remote users, along with any suitable metadata such as a title, tags, creator information, descriptive narrative, pictures, recommended printer settings, and so forth. In one aspect, the database 209 may be manually curated according to any desired standards. In another aspect, printable objects in the database 209 may be manually or automatically annotated according to content type, popularity, editorial commentary, and so forth.

The print server 208 may more generally provide a variety of management functions. For example, the print server 204 may store a location of a predetermined alternative three-dimensional printer to execute a print job from a remote user in the event of a failure by the one of the plurality of three-dimensional printers 204. In another aspect, the print server 208 may maintain exclusive control over at least one of the plurality of three-dimensional printers 204, such that other users and/or print servers cannot control the printer. In another aspect, the print server 208 may submit a print job to a first available one of the plurality of three-dimensional printers 204.

In another aspect, a print server 208 may provide an interface for managing subscriptions to sources of content. This may include tools for searching existing subscriptions, locating or specifying new sources, subscribing to sources of content, and so forth. In one aspect, a print server 208 may manage subscriptions and automatically direct new content from these subscriptions to a three-dimensional printer 204 according to any user-specified criteria. Thus while it is contemplated that a three-dimensional printer 204 may autonomously subscribe to sources of content through a network interface and receive new content directly from such sources, it is also contemplated that this feature may be maintained through a remote resource such as a print server 208.

A print server 208 may maintain print queues for participating three-dimensional printers 204. This approach may advantageously alleviate backlogs at individual printers 204, which may have limited memory capacity for pending print jobs. More generally, a print server 208 may, by communicating with multiple three-dimensional printers 204, obtain a view of utilization of multiple networked resources that permits a more efficient allocation of print jobs than would be possible through simple point-to-point communications among users and printers. Print queues may also be published by a print server 208 so that users can view pending queues for a variety of different three-dimensional printers 204 prior to selecting a resource for a print job. In one aspect, the print queue may be published as a number of print jobs and size of print jobs so that a requester can evaluate likely delays. In another aspect, the print queue may be published as an estimated time until a newly submitted print job can be initiated.

In one aspect, the print queue of one of the print servers 208 may include one or more print jobs for one of the plurality of three-dimensional printers 204. The print queue may be stored locally at the one of the plurality of three-dimensional printers. In another aspect, the print queue may be allocated between the database 209 and a local memory of the three-dimensional printer 204. In another aspect, the print queue may be stored, for example, in the database 209 of the print server 208. As used here, the term 'print queue' is intended to include print data (e.g., the three-dimensional model or tool instructions to fabricate an object) for a number of print job (which may be arranged for presentation in order of expected execution), as well as any metadata concerning print jobs. Thus, a portion of the print queue such as the metadata (e.g., size, status, time to completion) may be usefully communicated to a print server 208 for sharing among users while another portion of the print queue such as the model data may be stored at a printer in preparation for execution of a print job.

Print queues may implement various user preferences on prioritization. For example, for a commercial enterprise, longer print jobs may be deferred for after normal hours of operation (e.g., after 5:00 p.m.), while shorter print jobs may be executed first if they can be completed before the end of a business day. In this manner, objects can be identified and fabricated from within the print queue in a manner that permits as many objects as possible to be fabricated before a predetermined closing time. Similarly, commercial providers of fabrication services may charge explicitly for prioritized fabrication, and implement this prioritization by prioritizing print queues in a corresponding fashion.

In another aspect, a print server 208 may provide a virtual workspace for a user. In this virtual workspace, a user may search local or remote databases of printable objects, save objects of interest (or links thereto), manage pending prints, specify preferences for receiving status updates (e.g., by electronic mail or SMS text), manage subscriptions to content, search for new subscription sources, and so forth. In one aspect, the virtual workspace may be, or may include, web-based design tools or a web-based design interface that permits a user to create and modify models. In one aspect, the virtual workspace may be deployed on the web, while permitting direct fabrication of a model developed within that environment on a user-specified one of the three-dimensional printers 204, thus enabling a web-based design environment that is directly coupled to one or more fabrication resources.

The content sources 210 may include any sources of content for fabrication with a three-dimensional printer 204. This may, for example, include databases of objects accessible through a web interface or application programming interface. This may also or instead include individual desktop computers or the like configured as a server for hosted access, or configured to operate as a peer in a peer-to-peer network. This may also or instead include content subscription services, which may be made available in an unrestricted fashion, or may be made available on a paid subscription basis, or on an authenticated basis based upon some other relationship (e.g., purchase of a related product or a ticket to an event). It will be readily appreciated that any number of content providers may serve as content sources 210 as contemplated herein. By way of non-limiting example, the content sources 210 may include destinations such as amusement parks, museums, theaters, performance venues, or the like, any of which may provide content related to users who purchase tickets. The content sources 210 may include manufacturers such as automobile, computer, consumer electronics, or home appliance manufacturers, any of which may provide content related to upgrades, maintenance, repair, or other support of existing products that have been purchased. The content sources 210 may include artists or other creative enterprises that sell various works of interest. The content sources 210 may include engineering or architectural firms that provide marketing or advertising pieces to existing or prospective customers. The content sources 210 may include marketing or advertising firms that provide promotional items for clients. More generally, the content sources 210 may be any individual or enterprise that provides single or serial objects for fabrication by the three-dimensional printers 204 described herein.

One or more web servers 211 may provide web-based access to and from any of the other participants in the environment 200. While depicted as a separate network entity, it will be readily appreciated that a web server 211 may be logically or physically associated with one of the other devices described herein, and may, for example, provide a user interface for web access to one of the three-dimensional printers 204, one of the print servers 208 (or databases 209 coupled thereto), one of the content sources 210, or any of the other resources 216 described below in a manner that permits user interaction through the data network 202, e.g., from a client device 206 or mobile device 212.

The mobile devices 212 may be any form of mobile device, such as any wireless, battery-powered device, that might be used to interact with the networked printing environment 200. The mobile devices 212 may, for example, include laptop computers, tablets, thin client network computers, portable digital assistants, messaging devices, cellular phones, smart phones, portable media or entertainment devices, and so forth. In general, mobile devices 212 may be operated by users for a variety of user-oriented functions such as to locate printable objects, to submit objects for printing, to monitor a personally owned printer, and/or to monitor a pending print job. A mobile device 212 may include location awareness technology such as Global Positioning System ("GPS"), which may obtain information that can be usefully integrated into a printing operation in a variety of ways. For example, a user may select an object for printing and submit a model of the object to a print server, such as any of the print servers described above. The print server may determine a location of the mobile device 212 initiating the print job and locate a closest printer for fabrication of the object.

In another aspect, a printing function may be location-based, using the GPS input (or cellular network triangulation, proximity detection, or any other suitable location detection techniques). For example, a user may be authorized to print a model only when the user is near a location (e.g., within a geo-fenced area or otherwise proximal to a location), or only after a user has visited a location. Thus a user may be provided with printable content based upon locations that the user has visited, or while within a certain venue such as an amusement park, museum, theater, sports arena, hotel, or the like. Similarly, a matrix barcode such as a QR code may be employed for localization.

The other resources 216 may include any other software or hardware resources that may be usefully employed in networked printing applications as contemplated herein. For example, the other resources 216 may include payment processing servers or platforms used to authorize payment for content subscriptions, content purchases, or printing resources. As another example, the other resources 216 may include social networking platforms that may be used, e.g., to share three-dimensional models and/or fabrication results according to a user's social graph. In another aspect, the other resources 216 may include certificate servers or other security resources for third party verification of identity, encryption or decryption of three-dimensional models, and so forth. In another aspect, the other resources 216 may include online tools for three-dimensional design or modeling, as well as databases of objects, surface textures, build supplies, and so forth. In another aspect, the other resources 216 may include a desktop computer or the like co-located (e.g., on the same local area network with, or directly coupled to through a serial or USB cable) with one of the three-dimensional printers 204. In this case, the other resource 216 may provide supplemental functions for the three-dimensional printer 204 in a networked printing context such as maintaining a print queue or operating a web server for remote interaction with the three-dimensional printer 204. Other resources 216 also include supplemental resources such as three-dimensional scanners, cameras, and post-processing/finishing machines or resources. More generally, any resource that might be usefully integrated into a networked printing environment may be one of the resources 216 as contemplated herein.

It will be readily appreciated that the various components of the networked printing environment 200 described above may be arranged and configured to support networked printing in a variety of ways. For example, in one aspect there is disclosed herein a networked computer with a print server and a web interface to support networked three-dimensional printing. This device may include a print server, a database, and a web server as discussed above. The print server may be coupled through a data network to a plurality of three-dimensional printers and configured to receive status information from one or more sensors for each one of the plurality of three-dimensional printers. The print server may be further configured to manage a print queue for each one of the plurality of three-dimensional printers. The database may be coupled in a communicating relationship with the print server and configured to store print queue data and status information for each one of the plurality of three-dimensional printers. The web server may be configured to provide a user interface over the data network to a remote user, the user interface adapted to present the status information and the print queue data for one or more of the plurality of three-dimensional printers to the user and the user interface adapted to receive a print job from the remote user for one of the plurality of three-dimensional printers.

The three-dimensional printer 204 described above may be configured to autonomously subscribe to syndicated content sources and periodically receive and print objects from those sources. Thus in one aspect there is disclosed herein a device including any of the three-dimensional printers described above; a network interface; and a processor (which may without limitation include the controller for the printer). The processor may be configured to subscribe to a plurality of sources of content (such as the content sources 210 described above) selected by a user for fabrication by the three-dimensional printer through the network interface. The processor may be further configured to receive one or more three-dimensional models from the plurality of content sources 210, and to select one of the one or more three-dimensional models for fabrication by the three-dimensional printer 204 according to a user preference for prioritization. The user preference may, for example, preferentially prioritize particular content sources 210, or particular types of content (e.g., tools, games, artwork, upgrade parts, or content related to a particular interest of the user).

The memory of a three-dimensional printer 204 may be configured to store a queue of one or more additional three-dimensional models not selected for immediate fabrication. The processor may be programmed to periodically re-order or otherwise alter the queue according to pre-determined criteria or manual user input. For example, the processor may be configured to evaluate a new three-dimensional model based upon a user preference for prioritization, and to place the new three-dimensional model at a corresponding position in the queue. The processor may also or instead be configured to retrieve content from one of the content sources 210 by providing authorization credentials for the user, which may be stored at the three-dimensional printer or otherwise accessible for presentation to the content source 210. The processor may be configured to retrieve content from at least one of the plurality of content sources 210 by authorizing a payment from the user to a content provider. The processor may be configured to search a second group of sources of content (such as any of the content sources 210 described above) according to one or more search criteria provide by a user. This may also or instead include demographic information for the user, contextual information for the user, or any other implicit or explicit user information.

In another aspect, there is disclosed herein a system for managing subscriptions to three-dimensional content sources such as any of the content sources 210 described above. The system may include a web server configured to provide a user interface over a data network, which user interface is adapted to receive user preferences from a user including a subscription to a plurality of sources of a plurality of three-dimensional models, a prioritization of content from the plurality of sources, and an identification of one or more fabrication resources coupled to the data network and suitable for fabricating objects from the plurality of three-dimensional models. The system may also include a database to store the user preferences, and to receive and store the plurality of three-dimensional models as they are issued by the plurality of sources. The system may include a processor (e.g., of a print server 208, or alternatively of a client device 206 interacting with the print server 208) configured to select one of the plurality of three-dimensional models for fabrication based upon the prioritization. The system may include a print server configured to communicate with the one or more fabrication resources through the data network, to determine an availability of the one or more fabrication resources, and to transmit the selected one of the plurality of three-dimensional models to one of the one or more fabrication resources.

In another aspect, there is disclosed herein a network of three-dimensional printing resources comprising a plurality of three-dimensional printers, each one of the plurality of three-dimensional printers including a network interface; a server configured to manage execution of a plurality of print jobs by the plurality of three-dimensional printers; and a data network that couples the server and the plurality of three-dimensional printers in a communicating relationship.

In general as described above, the server may include a web-based user interface configured for a user to submit a new print job to the server and to monitor progress of the new print job. The web-based user interface may permit video monitoring of each one of the plurality of three-dimensional printers, or otherwise provide information useful to a remote user including image-based, simulation-based, textual-based or other information concerning status of a current print. The web-based user interface may include voice input and/or output for network-based voice control of a printer.

The fabrication resources may, for example, include any of the three-dimensional printers 204 described above. One or more of the fabrication resources may be a private fabrication resource secured with a credential-based access system. The user may provide, as a user preference and prior to use of the private fabrication resource, credentials for accessing the private fabrication resource. In another aspect, the one or more fabrication resources may include a commercial fabrication resource. In this case the user may provide an authorization to pay for use of the commercial fabrication resource in the form of a user preference prior to use of the commercial fabrication resource.

Many current three-dimensional printers require significant manufacturing time to fabricate an object. At the same time, certain printers may include a tool or system to enable multiple, sequential object prints without human supervision or intervention, such as a conveyor belt. In this context, prioritizing content may be particularly important to prevent crowding out of limited fabrication resources with low priority content that arrives periodically for autonomous fabrication. As a significant advantage, the systems and methods described herein permit prioritization using a variety of user-specified criteria, and permit use of multiple fabrication resources in appropriate circumstances. Thus prioritizing content as contemplated herein may include any useful form of prioritization. For example, this may include prioritizing the content according to source. The content sources 210 may have an explicit type that specifies the nature of the source (e.g., commercial or paid content, promotional content, product support content, non-commercial) or the type of content provided (e.g., automotive, consumer electronics, radio control hobbyist, contest prizes, and so forth). Prioritizing content may include prioritizing the content according to this type. The three-dimensional models themselves may also or instead include a type (e.g., tool, game, home, art, jewelry, replacement part, upgrade part, etc.) or any other metadata, and prioritizing the content may includes prioritizing the content according to this type and/or metadata.

In one aspect, the processor may be configured to select two or more of the plurality of three-dimensional models for concurrent fabrication by two or more of the plurality of fabrication resources based upon the prioritization when a priority of the two or more of the plurality of three-dimensional models exceeds a predetermined threshold. That is, where particular models individually have a priority above the predetermined threshold, multiple fabrication resources may be located and employed to fabricate these models concurrently. The predetermined threshold may be evaluated for each model individually, or for all of the models collectively such as on an aggregate or average basis.

In one aspect, the processor may be configured to adjust prioritization based upon a history of fabrication when a number of objects fabricated from one of the plurality of sources exceeds a predetermined threshold. Thus, for example, a user may limit the number of objects fabricated from a particular source, giving subsequent priority to content from other sources regardless of an objectively determined priority for a new object from the particular source. This prevents a single source from overwhelming a single fabrication resource, such as a personal three-dimensional printer operated by the user, in a manner that crowds out other content from other sources of possible interest. At the same time, this may enable content sources 210 to publish on any convenient schedule, without regard to whether and how subscribers will be able to fabricate objects.

In another aspect, the processor may be configured to identify one or more additional sources of content based upon a similarity to one of the plurality of sources of content. For example, where a content source 210 is an automotive manufacturer, the processor may perform a search for other automotive manufactures, related parts suppliers, mechanics, and so forth. The processor may also or instead be configured to identify one or more additional sources of content based upon a social graph of the user. This may, for example, include analyzing a social graph of relationships from the user to identify groups with common interests, shared professions, a shared history of schools or places of employment, or a common current or previous residence location, any of which may be used to locate other sources of content that may be of interest to the user.

Figure 3:
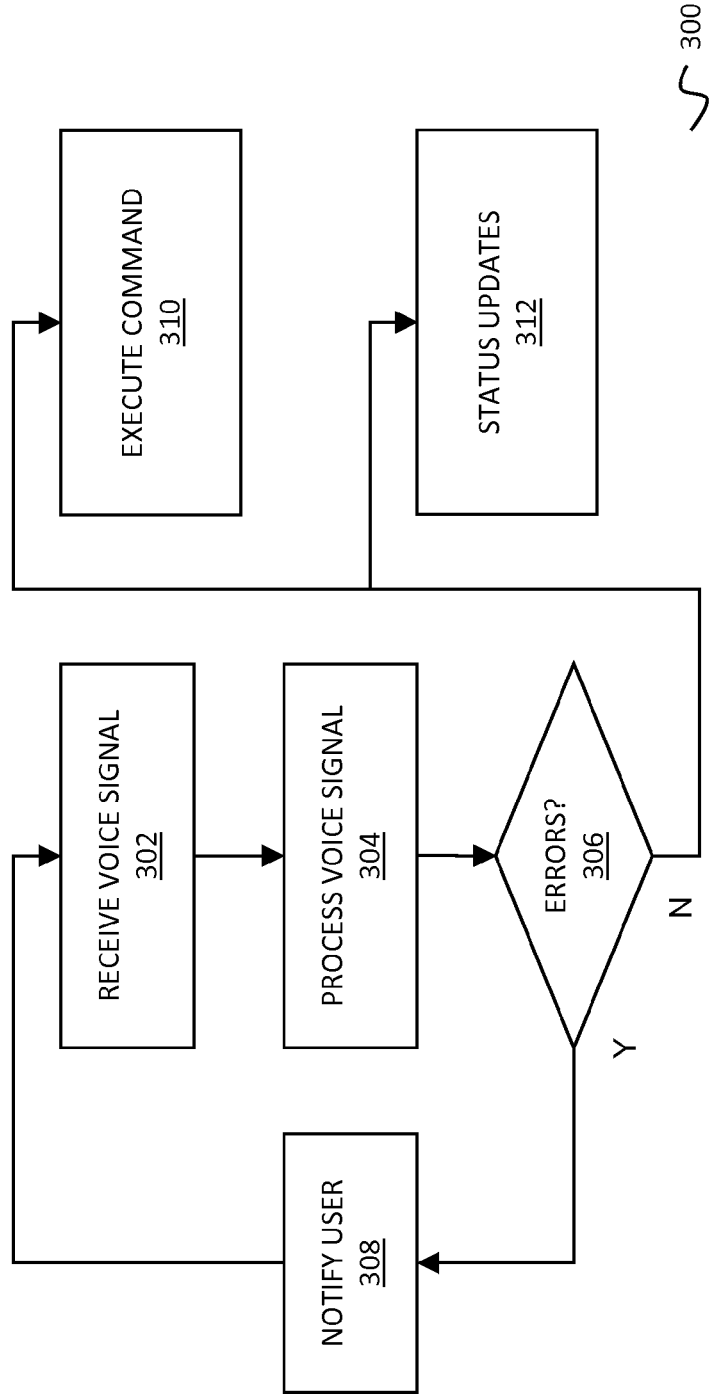
FIG. 3 shows a process for voice control of an additive fabrication system.

FIG. 3 shows a process for voice control of an additive fabrication system. It will be understood that the steps of the process 300 may in general be performed by various combinations of a processor or controller on a printer, a processor or controller on a device such as a computer coupled directly to the printer (e.g., through a USB or wired Ethernet connection), a processor on a client device, and/or a processor or controller hosted on a print server at a remote location. More generally, any combination of hardware and/or software, either centralized or distributed, may be used as a "processor" or "processing circuitry" to perform the steps described below.

The process 300 may include receiving a voice signal as shown in step 302. This may for example, include receiving an audio signal from a microphone or other audio input of the additive fabrication system or from a computer locally coupled to the additive fabrication system. The microphone or an associated controller may capture acoustic energy directly as digital audio, or an analog signal from the microphone may be digitized as appropriate using any suitable hardware and/or software.

The process 300 may include processing the voice signal as shown in step 304. It will be appreciated that this processing step may include a wide range of speech recognition techniques such as voice recognition, speech recognition, keyword analysis, semantic analysis, and so forth.

For example, processing the voice signal may include voice recognition using any known techniques to identify a speaker. In this manner, the process 300 may include authenticating a user based upon the voice signal. Voice-based user authentication may be used, e.g., to limit access to a fabrication resource to one or more predetermined users, or to separate spoken commands by one of the predetermined users from other voices and noise within an audio environment of the fabrication resource.

In another aspect, processing the voice signal may include word or phrase extraction. So for example, the voice signal may be processed to extract a command for the additive fabrication system, as well as any other useful information. In general, a syntax for voice control of an additive fabrication system is contemplated as containing the following components: global identifier, command, [object identifier], [dimensional specification], [print parameter1], [print parameter 2], . . . . The global identifier may be any voice preamble to identify a spoken printer command. This may include the name of the printer or other fabrication resource, or some other global or machine-specific indicator. The command may be any command recognizable by the printer, or interpretable as one or more commands recognizable by the printer. While an instruction to print is one form of command, other maintenance functions and the like may also or instead be spoken, such as a command to calibrate, load build material, run a script or batch file, stop a print, pause a print, and so forth. Any number of optional parameters may be specified according to a particular command. The parameters for a "print" command are discussed below by way of an exemplary embodiment of this general syntax. Such a print command may provide an instruction to fabricate an object, and information may be extracted according to the syntax such as an object identifier and/or a dimensional specification for fabricating the object. In addition to the preamble, the syntax may permit (or require) a terminator indicating the end of a spoken command, which may simplify and speed up subsequent processing by explicitly identifying the conclusion of the spoken command.

The object identifier may specify a three-dimensional model of an object, which may be for example a stereolithography file (e.g., STL), a computer aided design file (e.g., CAD), a tool instruction file (e.g., gcode), or any other computerized representation of an object suitable for fabrication. The object identifier may specify the object or model by filename, file metadata, or any other identifying information useful for locating a file corresponding to the requested object. In one aspect, a user may explicitly specify a file name (e.g. by stating "file . . . "). In another aspect, the user may explicitly specify an object (e.g., by stating "coaster"). The processing may optionally include any amount of machine intelligence that can identify files for objects of interest based upon a spoken request.

The dimensional specification may provide any dimensional information useful for fabricating the object. For example, the dimensional specification may include a scale of the object. This may be a relative scale such as a percentage of a working volume of a printer, or a scale relative to some absolute dimensions of the object model. This may also include a physical dimension of the object. For example, a user may specify a height (e.g., z-axis), a width, or a depth of the fabricated object in physical dimensions such as inches or centimeters. The dimensional specification may also or instead include combinations of these, such as by specifying an object height of 50% of the height of the working volume. The dimensional specification may also include independent scaling of different dimensions, such as by specifying a reduction of the object in a single dimension.

Other information may optionally be included with a print command. For example, where a printer has a supply of multiple different build materials a user may provide (and the processor may be configured to extract from the voice signal) a build material specification that is used to select a type of the build material for the additive fabrication system to fabricate the object. This may include a color specification used to select a color of the build material. The type may more generally be one of a number of different types of material such as support materials versus build materials, or various types of polymers having different properties for strength, solubility, elasticity, and so forth. Additional processing may be provided during fabrication subsequent to this type of request/command. For example, where the additive fabrication system contains suitable instrumentation such as a camera or other sensor to detect the type of material actually being used to build an object, the process may include detecting the material type and comparing to the requested type to confirm that the actual build corresponds to the requested build.

Other print parameters may also or instead be included with a print command, and the voice signal may be processed to extract any such parameters. For example, a processor may extract parameters relating to a print such as an infill percentage, a layer thickness, a tool temperature, a tool speed, a material deposition rate, and so forth. Other print parameters may also or instead include general parameters such as a request to optimize for relative speed of a print (e.g., fast, medium, or slow), weight of an object, strength of an object, quality of a print, and so forth. Other parameters may include, e.g., a number of objects to print, in which case additional processing may be provided in order to automatically position multiple objects on a build platform. Or where a printer can pause and restart a print, the parameters may include a specification of a maximum unattended duration of print, after which the printer may ask for a manual confirmation to proceed. The syntax may similarly support a command to resume printing after a user-initiated or automatic pause.

More generally, any parameter or group of parameters for a print (or more generally, any other command) may be spoken and interpreted by the printer. While the general syntax described above contemplates specific keywords (optionally including related values), a variety of natural speech techniques or the like may also or instead be employed to extract meaning relevant to a print command from the voice signal, and all such variations that would be apparent to one of ordinary skill in the art are intended to fall within the scope of this invention.

While the use of a predetermined syntax, and more specifically a syntax adapted to three-dimensional printing, can greatly simplify speech recognition and interactive voice control by restricting the computational task to the context of the three-dimensional printer, it will also be appreciated that a wide range of natural language processing techniques are known in the art that may be usefully employed with a voice-controlled three-dimensional printer as contemplated herein.

The process 300 may also provide feedback requesting clarification or disambiguation, which feedback may be spoken feedback using speech synthesis, or visual or textual feedback displayed on a monitor associated with the fabrication resource. Similarly, an audible tone or the like me be used to generally prompt a user for action. Thus, where a user requests a print of a boat, the fabrication resource may provide a spoken response such as, "Okay, I have found three boats named x, y, and z." This notion is discussed below under the rubric of "errors", although requests for feedback more generally contemplate clarifications for any omission, ambiguity, inconsistency, or other result of a malformed, incomplete, or otherwise uninterpretable spoken command. Similarly, feedback or an "error" may relate to machine readiness, or other items that may arise despite a syntactically perfect spoken command.

The process 300 may include error checking as shown in step 306. If errors are detected then the process may proceed to step 308 where a user is notified. If no errors are detected, then the process 300 may proceed to additional steps such as executing the command. In general, error checking may include any analysis of the command for errors, ambiguities, inconsistencies, omissions, and so forth. The error may relate to the command, such as where the command is unrecognized, or where the command is recognized as a known command but the additional information does not corresponding to the known command. The error may also or instead include an incomplete command, such as where at least one element (e.g., a required element) is missing. For example, a command to print may require a specific object or file to be identified. If no object identifier is provided, then this missing element may be identified as an error. Similarly, where an object identifier is provided in the voice signal, but the object identifier cannot be correlated to any printable object, this may cause an error. An error may also or instead occur if the object identifier requires disambiguation to identify a unique printable object from a number of potentially responsive files/objects.

Any required elements for a recognized command may be searched for in the voice signal, and an error may be reported when such a required element is missing. For example, a print may require a dimensional specification which, if missing, will cause an error when analyzing the voice signal. In another aspect, the dimensional specification may be present, but still contain an error. This may be referenced to print capabilities, such as where the dimensional specification includes or results in a dimension that exceeds the build volume of the additive fabrication system. Similarly, an error may be caused by a dimensional specification that exceeds some other dimensional processing capability of the additive fabrication system, such as where the object is smaller than a print resolution of the additive fabrication system, or where the object contains features smaller than the print resolution.

In general, error checking as contemplated herein may occur at any time during the process 300, and may be continuously performed or performed at one or more discrete times during the process 300, or some combination of these. Thus while error checking is depicted as a single event in the flow chart of FIG. 3, it will be understood that checking a voice signal or commands therein for errors is not so limited. For example, certain types of errors may not manifest until a print is initiated or until during a print (e.g., a machine error due to exhaustion of build material). In addition, it will be appreciated that different types of error checking may be performed at different times within the process 300.

Error checking might also include precautions against the vagaries of spoken human communication. An indecisive user might say, "MakerBot, make me a cube three inches tall. No wait, that should probably be two inches tall. No not a cube. What's that thing with unequal sides? A rectangular prism. No, no, wait, the cube is right after all. Just make it two inches." A voice processor can parse this rambling command to the best of its abilities, and it might reach a definitive semantic conclusion or it might not. But where there are signs of uncertainty, the process should at least request some form of confirmation before taking further steps. So a spoken request for confirmation might be issued as follows: "Okay, I am going to print a cube two inches tall. Shall I begin?"

The process 300 may include notifying a user of errors as shown in step 308. For example, the processor may be configured to identify an error in the voice signal, and to request a clarification for the error with spoken output through the speaker. Any other form of notification may also or instead be used, such as by displaying the notification on a screen or using any other audible or visual indicator.

The process 300 may include executing a command with an additive fabrication system based upon the voice signal as shown in step 310. For example, when the command includes a print command, the process 300 may cause the additive fabrication system to execute the print command based upon the object identifier and the dimensional specification, and/or based upon any other information relevant to the print command. As another example, where the command queries the additive fabrication system for status information or the like, the additive fabrication system may execute the command with a spoken response (or any other suitable response).

The process 300 may include providing status updates while a command is executing as shown in step 312. For example, the additive fabrication system, or a processor thereof, may be configured to provide a status update as spoken output through the speaker, or through any other user interface device(s) and/or techniques. The status update may relate to completion of a build. This may include status updates on a predetermined, periodic basis (e.g., every ten minutes), or at predetermined milestones during a build (e.g. deciles of completion), or upon the occurrence of events such as when an error occurs or when a build is completed. The status updates may also or instead relate to availability of the additive fabrication system, including an indication of whether or not the system is ready, and where the system is unavailable, an expected time until the system will be ready to execute the command in the voice signal. The status updates may also or instead relate to instrumentation of the additive fabrication system, such as information concerning tool temperatures or hardware error conditions.

As described above, an additive fabrication resource may be provided with an interactive voice recognition module for voice-controlled printing. In general, speech recognition is a very complex problem. Vocalizations vary in terms of accent, pronunciation, articulation, roughness, nasality, pitch, volume, and speed. Speech can also be distorted by a background noise and echoes, electrical characteristics, and so forth. Thus, accuracy of speech recognition can vary with vocabulary size and confusability, the presence of multiple speakers, whether the speech is isolated or continuous, whether the words are read aloud or spontaneous, and so forth. Against this complex backdrop, the computational complexity of voice processing may be substantially improved by specifically addressing a limited vocabulary of printer-relevant commands and related parameters.

A variety of techniques have been developed for voice recognition on one hand (e.g., Hidden Markov Models or Dynamic Time Warping), and speech synthesis on the other. These may be implemented in software, hardware, or some combination of these to generally support voice input and output for a printer. Similarly, a variety of natural language processing tools are known in the art, any of which may be adapted for use in semantic analysis of printer-related spoken commands and/or suitable responses. Currently, there are a variety of commercially available tools for the design and implementation of interactive voice interfaces including without limitation open source projects such as CMU Sphinx, Julius, simon, iATROS, RWTH ASR, and SHoUT, as well as a variety of applications for mobile devices, PC's, and Apple products. These and related techniques may be configured to provide a voice-based user interface to a three-dimensional printer as described above.

More complex commands may also be supported, such as commands to merge multiple objects/files (in which case details about scale and orientation might be requested), or commands to execute scripts or other commands by the printer. In another aspect, more complex commands relating to networked printing may be issued, such as commands to post/share new models or pictures of successful prints, or commands to search networked sources for content. With suitable software support, more complex commands may also be spoken to and processed by a printer.

Using these techniques, a variety of simple and complex printing and maintenance functions may be performed, including various types of interactive voice control. For example, where a search for an object within available resources (which may be based upon file names, metadata such as tags and descriptions, and so forth) does not yield any results, a spoken request for clarification may be issued in any suitable form, or when multiple objects are found, a spoken request for disambiguation may be issued. Similarly, where the scale or dimensions exceed a build volume for a printer, a user may be queried whether to fit to the build volume or divide the model into multiple parts (for which mechanical registration/connections may be automatically generated).

In this manner, a wide range of spoken commands may be accurately interpreted by a printer to achieve user-desired affects. By way of example and not limitation, a spoken command might be:

"MakerBot, make me a ring, size 12 with a diamond on top."

"MakerBot, make me thing number 1337, engage."

"MakerBot, make me thing number 4242, increase size 12%."

"MakerBot, make me thing number 10000, using #3 settings."

"MakerBot, run calibration script 1."

"MakerBot, run share script 1, upload photo to flickr and share URL on twitter."

"MakerBot, print today's most popular object from Thingiverse."

"MakerBot, tell me the current printer state."

"MakerBot, tell me the temperature of the extruder."

"MakerBot Stop! Stop! Stop!"

The use of voice input might also prompt a wide range of interpretive modes less strictly tied to the literal content of a spoken command. For example, a hopeful user might say, "MakerBot, tea, Earl Grey, hot." Of course, the printer would not ordinarily fabricate tea out of ABS plastic, and it would be an unusual printer indeed that had immediate access to hot Earl Gray tea. But a speech recognition system might programmatically identify this reference to one of the catch phrases of a legendary starship commander, and respond in kind by fabricating a replica of Captain Picard's tea cup, perhaps even invoking an appropriate spoken response such as "Yes, Captain."

Similarly, when parsing a spoken command, a user's context can be taken into account. So, if a user says, "MakerBot, make me the sports stadium I was at last night," the processor can (upon recognizing this request) recall GPS or other location data for the user, such as from the user's cell phone, and correlate this to a stadium that can in turn be used to locate relevant printable models. A particularly clever program might look elsewhere for relevant information, such within as a user's computerized address book or online calendar for corresponding events that are calendared for the preceding day, or within financial software that might contain records of ticket purchases. However obtained, the contextual information may be used to identify models for printing, and/or to parameterize the model or a request to print the model.

A bit of discretion is advisable when a printer can act on the basis of spoken input. It may be nice to have a printer that is always ready to receive a spoken print command, and that responds without question to urgent requests to abort a print gone awry. But a printer's ability to autonomously execute print commands without any confirmation can lead to a variety of difficulties. The printer's queue might fill up with day's worth of unwanted print jobs. Or worse, the printer might go off and start printing undesirable objects on the basis of snippets of background conversation. So there are times when user confirmations are appropriate and other times when they are not. Such things being within the skill of a typical programmer, the details are not recounted here, except to say that a well behaved printer will selectively solicit spoken confirmations from a user.

In another aspect, background monitoring creates some interesting possibilities for a printer. Consider a printer with voice control situated in a room near a television. The printer could be easily configured to print objects in response to voice cues from a televised actor. When an actor in a television program issues a print command, the printer (which can apply voice recognition to confidently identify the actor) might respond by printing a topical object. The print command can be surreptitiously buried in dialogue, and serve more as a queue to print that a conventional print command. Or the print command might be a reasonable analog for a print command. So if a televised broadcast includes the following dialogue: "Wonder Twin powers, activate! Form of a bunny!" a printer may respond by fabricating a bunny, which could be any available bunny model, or a specific bunny model linked to that print command.

It will also be appreciated that various techniques may be usefully employed to shift processing intensive steps of speech processing to remote sources. For example, an audio input and suitable processing circuitry may be used on a printer to digitize voice commands as a voice sample. The voice sample may then be transmitted to a personal computer coupled to the printer. The personal computer may process the voice sample, e.g., for speaker identification (also referred to in the art as voice recognition) and/or speech recognition, or the personal computer may transmit the voice sample to a remote resource such as a web site or other networked resource for processing and extraction of words and/or meaning.

In one aspect, the local personal computer may perform voice recognition to determine whether the identity of the speaker corresponds to a user with authority to issue commands to the printer. In this manner, access control may be implicitly supported by limiting voice interactions to authorized users. The speech recognition may then be performed locally or remotely (e.g., at a remote print server) as generally contemplated above. Thus in one aspect there is disclosed herein a remote speech recognition server for use with a three-dimensional printer. The remote speech recognition server may use any of the techniques described above, where some or all of the processing, such as the computationally expensive processing, is performed on the server. In another aspect, a remote resource may be a printing-specific speech recognition system adapted to identify printer-related commands, and to identify ambiguities in such commands requiring clarification. Required clarifications may be communicated back to the personal computer and/or printer as specific word sequences for synthesized spoken output, or as text or the like that can be locally interpreted (again by the printer or the personal computer) for display and/or speech output in any suitable manner.

It will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

A printer equipped for audio monitoring may adapt this hardware and associated processing for other audio-based monitoring. For example, after a print has been initiated, the printer may monitor for spoken commands such as "stop" or "pause." In this context, the processing may include voice recognition as described above in order to determine whether the speaker is an authorized user. In this manner, the impact of background noise and conversation on an operating machine can be mitigated. Audio monitoring may also be extended to check for non-spoken input.

For example, a microphone may listen to operation of a machine for possible error conditions such as a stopped build (which may manifest as an untimely silence), or motor-driven hardware that has moved to a mechanical stop without detection by other system hardware/software. This latter condition can manifest as a somewhat unsettling grinding, thunking, or chunking sound. Sometimes this audio bark is worse than its bite, but it is possible to inflict substantial damage to a fabrication system when using powerful DC motors to push things in directions that they were not intended to go. This type of audible hardware malfunction can be easily detected in an audio signal. And so a microphone and processor configured to monitor for various audio stopping conditions might provide a useful safeguard to a user's beloved three-dimensional printer, particularly at those times when the user is not there to personally intervene.

FIG. 4 shows a process for interactive voice control of a printer. The process 400 may begin with receiving a voice signal 402 as described above.

As shown in step 404, the process 400 may include processing the voice signal. This may include parsing the voice signal for voice commands that initiate interactive voice response.

For example, the voice command may initiate a three-dimensional modeling process in which a user interactively provides information to create a model for fabrication. A variety of techniques are known for creating and maintaining computerized interactive voice sessions, and the details are omitted here for simplicity. Suffice it to say that an interactive voice session may be hosted in a variety of locations (e.g., a remote server, a printer, or a local device such as a computer or smart phone), and may use a fixed or dynamic, contextual dialogue flow (or of course, some of both). Where the flow is fixed, the structure of the dialogue might come from any suitable source. For example, a website may provide customizable three-dimensional models that can be personalized with text or otherwise modified in different ways according to various parameters. The website may explicitly provide a series of questions in any suitable form to permit spoken customization according to these parameters. So a dialogue with an interactive voice response system ("IVRS") might go something like:

User: "Make me a medallion"
IVRS: "What would you like the medallion to say?"
User: "Happy Birthday Max."
IVRS: "Okay. What shape would you like? I can make it square, round, oval, or diamond shaped."
User: "Oh, definitely round."
IVRS: "Okay. I will make it round. Would you like raised edges?"
User: "Yes, please."

This may proceed through any number of requests for additional information as shown in steps 406 and 408, where each new request (which may be spoken, or displayed on a screen or the like) is received as a new voice signal as the process 400 returns to step 402.

This dialogue may accommodate voice-controlled modeling in a three-dimensional modeling environment, with commands such as "stretch the model 10% on the x-axis" or "place a cube underneath a trophy." Where a term such as "trophy" is not unambiguously linked to a particular object model, clarification may be requested. So for example the IVRS might as the user to identify or provide a specific model ("Where can I find a model of a trophy?"), or the IVRS might search for potentially relevant models and request confirmation ("I found three models of trophies. Would you like me to use . . . ?"). Similarly, a dynamic dialogue might use questions based upon printer capabilities. For example, the request for information might be, "What color would you like to use? I can print in red or yellow."

And so, the process 400 can cycle through any number of predetermined or dynamically generated questions until enough information is obtained to fabricate an object.

As shown in step 410, the process 400 may then include requesting confirmation. This request may be spoken, and may include various user-selected details of the build. For example, a voice may state, "I am going to build a two inch trophy on top of a two inch cube. Shall I proceed?"

As shown in step 412, the process 400 may include receiving a confirmation, which may be a confirmation spoken by the user. The confirmation may in general take any form. For example, the confirmation may have a strict syntax where the only acceptable confirmation is, e.g., "yes." Or the confirmation may have an open syntax where any form of affirmation will be accepted. This may include phrases such as "yes please," "go for it," "engage," "sure thing," or "you bet." Similarly, a confirmation may be manually entered using a keyboard, mouse, or other input device.

As shown in step 412, the printer may then execute a print to fabricate the requested object.

In this general manner, a wide range of interactive modeling and print control processes may be realized through spoken dialogue, and all such variations that would be apparent to one of ordinary skill in the art are intended to fall within the scope of this disclosure.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While particular embodiments of the present invention have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A device comprising:
   an additive fabrication system, wherein the additive fabrication system includes a three-dimensional printer;
   an audio input coupled to the additive fabrication system;
   an audio output coupled to the additive fabrication system; and
   a processor configured to receive a voice signal from the audio input, process the voice signal to extract a command for the additive fabrication system, an object identifier that specifies a three-dimensional model of an object, and at least one dimensional specification including a physical dimension specifying one or more of a height, a width, and a depth of a fabricated object fabricated by the three-dimensional printer based upon the three-dimensional model specified by the object identifier, and when the command includes a print command, to cause the additive fabrication system to execute the print command based upon the object identifier and the dimensional specification.

2. The device of claim 1 wherein the processor is further configured to identify an error in the voice signal, and to request a clarification for the error with spoken output through the audio output.

3. The device of claim 2 wherein the error relates to the command.

4. The device of claim 3 wherein the error includes an unrecognized command.

5. The device of claim 3 wherein the error includes an incomplete command wherein at least one element is missing.

6. The device of claim 5 wherein the incomplete command is an incomplete print command, and wherein the at least one element includes the object identifier or the dimensional specification.

7. The device of claim 3 wherein the error occurs when the object identifier cannot be correlated to any printable object.

8. The device of claim 3 wherein the error occurs because the object identifier requires disambiguation to resolve to a unique printable object.

9. The device of claim 3 wherein the error relates to the dimensional specification.

10. The device of claim 9 wherein the dimensional specification exceeds a build volume of the additive fabrication system.

11. The device of claim 9 wherein the dimensional specification exceeds a dimensional processing capability of the additive fabrication system.

12. The device of claim 1 wherein the print command includes an instruction to fabricate the object with the three-dimensional printer.

13. The device of claim 1 wherein the object identifier includes at least one of a file name and file metadata.

14. The device of claim 1 wherein the dimensional specification includes at least one of a scale of an object and a dimension of an object, the dimension of the object further including at least one of height, width, and depth.

15. The device of claim 1 wherein the processor is further configured to extract a build material specification from the voice signal, the build material specification used to select a type of the build material for the additive fabrication system.

16. The device of claim 15 wherein the build material specification includes a color specification used to select a color of the build material.

17. The device of claim 15 wherein the type is one of a plurality of different types of build material available to the additive fabrication system.

18. The device of claim 15 wherein the additive fabrication system is configured to detect the type of the build material using at least one sensor, and wherein the processor is configured to confirm that the actual build material corresponds to the type of the build material corresponds to the build material specification.

19. The device of claim 1 wherein the processor is further configured to extract one or more print parameters from the voice signal.

20. The device of claim 19 wherein the one or more print parameters include an infill percentage.

21. The device of claim 19 wherein the one or more print parameters include a relative print speed.

22. The device of claim 1 wherein the processor is further configured to provide a status update as spoken output through the audio output.

23. The device of claim 22 wherein the status update relates to completion of a build.

24. The device of claim 22 wherein the status update relates to availability of the additive fabrication system.

25. The device of claim 22 wherein the status update relates to instrumentation of the additive fabrication system.

26. The device of claim 1 wherein the processor is further configured to transmit the voice signal in digital form to a remote processing facility for speech recognition.

27. The device of claim 26 wherein the remote processing facility returns instructions to additive fabrication system.

28. The device of claim 26 wherein the remote processing facility returns text to the processor, the processor further configured to parse the text into one or more commands for the additive fabrication system.

29. The device of claim 1 wherein the audio input includes a microphone.

30. The device of claim 1 wherein the audio output includes a speaker.

* * * * *

UNITED STATES PATENT AND TRADEMARK OFFICE
CERTIFICATE OF CORRECTION

| | | |
|---|---|---|
| PATENT NO. | : 9,108,450 B2 | Page 1 of 1 |
| APPLICATION NO. | : 13/556012 | |
| DATED | : August 18, 2015 | |
| INVENTOR(S) | : Anthony James Buser et al. | |

It is certified that error appears in the above-identified patent and that said Letters Patent is hereby corrected as shown below:

On the Title Page, for the reproduced drawing of Fig. 4, under the last method step of EXECUTE PRINT, the reference numeral "412" should instead read -- 414 --.

In the Drawings, Sheet 4, Fig. 4, under the last method step of EXECUTE PRINT, the reference numeral "412" should instead read -- 414 --.

In the Specification
In Column 25, Line 55, delete "As shown in step 412" and insert -- As shown in step 414 --.

Signed and Sealed this
Twenty-second Day of December, 2015

Michelle K. Lee
*Director of the United States Patent and Trademark Office*